(12) United States Patent
Valeriano (10) Patent No.: US 9,164,811 B1
(45) Date of Patent: Oct. 20, 2015

(54) SYNCHRONIZE MULTIPART JOBS THROUGH AUTOMATION WORKFLOW

(71) Applicant: XEROX Corporation, Norwalk, CT (US)

(72) Inventor: Francisco M. Valeriano, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/279,440

(22) Filed: May 16, 2014

(51) Int. Cl.
*G06F 9/46* (2006.01)
*G06F 9/52* (2006.01)
*G06F 9/48* (2006.01)

(52) U.S. Cl.
CPC ... *G06F 9/52* (2013.01); *G06F 9/48* (2013.01)

(58) Field of Classification Search
CPC ...................................... G06F 9/52; G06F 9/48
See application file for complete search history.

(56) References Cited

U.S. PATENT DOCUMENTS

| | | | | | |
|---|---|---|---|---|---|
| 5,408,663 | A | * | 4/1995 | Miller | 718/104 |
| 5,581,691 | A | * | 12/1996 | Hsu et al. | 714/15 |
| 5,937,388 | A | * | 8/1999 | Davis et al. | 705/7.26 |
| 6,052,684 | A | * | 4/2000 | Du | 1/1 |
| 6,411,314 | B1 | * | 6/2002 | Hansen et al. | 715/769 |
| 7,155,720 | B2 | * | 12/2006 | Casati et al. | 718/104 |
| 7,272,820 | B2 | * | 9/2007 | Klianev | 717/109 |
| 7,299,244 | B2 | * | 11/2007 | Hertling et al. | 707/694 |
| 7,389,335 | B2 | | 6/2008 | MacLeod et al. | |
| 7,802,174 | B2 | | 9/2010 | Teng et al. | |
| 7,933,965 | B2 | | 4/2011 | Bonar et al. | |
| 7,983,943 | B2 | | 7/2011 | Morales et al. | |
| 8,424,011 | B2 | | 4/2013 | Barros et al. | |
| 8,549,535 | B2 | * | 10/2013 | Dorn et al. | 718/106 |
| 2008/0147467 | A1 | | 6/2008 | Daum | |

FOREIGN PATENT DOCUMENTS

WO  0058873  10/2000

OTHER PUBLICATIONS

Kim et al. "AWorkflow Fragmentation Framework for Enterprise GridWorkflow Systems", 2010 IEEE, pp. 79-84.*
Min et al. "The Inter-operating Mechanism of the Alliance-Collaboration-Oriented Dynamic Grid Workflow", 2007 IEEE, pp. 301-306.*
De Smet et al. "Dynamic Workflow Instrumentation for Windows Workflow Foundation", 2007 IEEE, 6 pages.*

* cited by examiner

*Primary Examiner* — Van Nguyen
(74) *Attorney, Agent, or Firm* — Gibb & Riley, LLC (57) ABSTRACT

Methods and systems herein determine the relative order in which tasks of a workflow are performed based on verified directional processing links of the tasks. This determines the relative processing order of collection tasks based on the directional processing links. These methods and systems further identify which of the collection tasks to perform in parallel based on which of the collection tasks do not use output from other collection tasks. Additionally, these methods and systems determine the relative processing order of each group of tasks. Tasks in the same group provide output to the same collection task. Also, such methods and systems identify which tasks to perform in parallel based on which tasks do not use output from other the tasks within the same group.

20 Claims, 6 Drawing Sheets

SYNCHRONIZE MULTIPART JOBS THROUGH AUTOMATION WORKFLOW

BACKGROUND

Systems and methods herein generally relate to automated workflows, such a document production and document processing workflows, and to making workflows run more efficiently.

In automated document workflows, sets of documents are processed according to the steps described in a workflow, typically with little or no user intervention. A job may include a number of documents that should be processed together according to the rules described in a workflow. A workflow can be represented as a graph with nodes representing tasks and directed edges representing transitions between tasks. In this disclosure, the words "task" and "node" are used interchangeably. In a simple job execution all documents in a job would transition together from one task to the next beginning at the starting node and finishing at one terminal node. In some situations a job should be partitioned into two or more independent pieces of work that, for the purpose of this disclosure, are called sub-jobs such that each one of these sub-jobs could follow an independent path of execution and possibly have, at any point in time, a different active task. Sub-jobs are useful when different parts of a job require different type of processing. Sub-jobs also allow for the parallel execution of activities.

To support sub-jobs, workflow definition languages include a special task that enables the creation of a number of sub-jobs from a given job/sub-job and another special task that combines one or more sub-jobs into a single sub-job/job. In the context of this disclosure, those special tasks are called "split" and "join" respectively. The join task affects a number of executing sub-jobs. These executing sub-jobs, upon their arrival to the join task, are combined in a single sub-job. The difficulty in implementing the join task is that it is hard to know which executing sub-jobs in the system are ever going to arrive to that particular join task. So, when the first sub-job arrives at the join task, the system should decide if needs to wait for other sub-jobs or continue, if it decides to wait, a similar decision should be made when a second sub-job arrives to the task. A decision should be made regarding whether the system should wait for an additional sub jobs, or combine all sub-jobs already at the join task into a single sub-job and continue. Given that the workflow processing engine is an abstraction of a general computation system, the general problem is, by definition, undecidable. Nevertheless, for practical purposes a solution could be useful in the narrow context of document workflows.

One desirable characteristic of a solution for this is that a solution should be repeatable in that the solution should only depend on the input documents and the transformations described in the workflow. The solution should not depend on, for example, how long it takes to process a particular sub-job at a particular task or set of tasks. Another desirable characteristic is that the specification of a join task should not constrain significantly the types of workflows that can be processed by the system.

In general workflow systems, constructs similar to the join task described above are available. Some systems can specify an activity whose execution only starts when a number of incoming execution flows reach that activity. However, such systems should know in advance how many of these flows will actually contain sub-jobs at run time and these do not account for the case that multiple sub-jobs may follow the same path. For example, a document workflow may split a job into potentially five different branches requiring different processing. At run time, the documents of the job may be split so that three documents travel through one branch, two documents travel through another branch, and no documents go through any of the other branches. Only when all of these five documents reach the join node should the workflow be allowed to continue.

Other workflow systems pair split and join activities. In such systems, all the control flows that are created at a given split are collapsed at the corresponding join. This approach significantly limits the number of document workflows that can be processed. For example, a workflow may start with two input documents requiring different initial pre-press steps. At some point, each one of these documents go into a split node that divides each document into a color and a grayscale portion. After some more processing (for example color correction) it may be beneficial to join the two color sub-jobs (and/or the two grayscale sub-jobs) to impose them together before printing. However, in this scenario, the all sub-jobs that contain the color portions were not created in the same split, so this particular workflow could not be modeled using the paired splits and joins.

SUMMARY

Exemplary methods herein receive (into a computerized device) processing tasks, which in this example are document processing tasks, as part of a workflow being designed, which in this example is a document processing workflow being designed. Such methods also receive, into the computerized device, directional processing links (forward and backward links) specifying the relative processing order of at least two of the document processing tasks.

At workflow creation time the user decides which tasks are marked as collection tasks. Furthermore marking a task as a "collection" task is the same as making that task a "join" task. The term "join" describe what happens to the sub-jobs that arrive to that task, the "collection" mark is the mechanism that the methods and systems use for identifying which tasks are join tasks. Also, any task in the workflow could be marked as a "collection task." A collection or join task will (potentially) synchronize the execution of multiple sub-jobs and create a single sub-job from all of them. It is possible for multiple sub-jobs to arrive to the collection task from the same preceding task.

These methods automatically validate the directional processing links as the directional processing links are input based on consistency with previously input directional processing links of the document processing workflow being designed, using the computerized device. After validating the directional processing links for the document processing tasks received, such methods automatically finalize the document processing workflow being designed, using the computerized device, to output a finalized workflow.

The computerized device(s) receive a document processing job, and such methods automatically run the finalized workflow using the computerized device to execute the document processing job on a document processing device (e.g., multi-function device, printer, copier, finishing device, facsimile machine, etc.). During such processing, the methods herein automatically determine the relative order in which the document processing tasks are performed.

Also, this processing automatically determines the relative processing order of the collection tasks based on the directional processing links (again, using the computerized device). Within the relative processing order of the collection tasks, these methods also automatically identify which of the collection tasks to perform in parallel based on which of the collection tasks do not use output from other collection tasks (again, using the computerized device).

The methods herein can ignore the relative order of any tasks that are not collection tasks, and systems herein may execute tasks using different approaches that focus more on optimization of performance than the synchronization of execution of sub-jobs. Further, with these methods the order of execution is as simple as: once the input data for a task is ready, that task is executed. Some systems may execute jobs using a pipeline architecture in which there are multiple active tasks connected through partial input/output and the methods herein are applicable to any of those systems. Also, such methods automatically identify which document processing tasks to perform in parallel. One mechanism that is used to identify tasks that are executed in parallel are sub-jobs. Given that sub-jobs are independent units of work, tasks from different sub-jobs can be executed in parallel.

These methods additionally identify loopback paths. Any path between two nodes of the workflow that contains at least one path that is marked as a backwards path is a loopback path. The marking of paths as backwards paths happens at workflow creation time. For example, in a workflow that has a path that goes from A to B and another path that goes from B to A, one of those paths is a forward path and the other one is a backward path. The person creating the workflow makes that determination at workflow creation time. In the methods herein, the path that is created first is the forward path the path that is created last is marked as the backward path.

While running the finalized workflow, such methods identify which document processing tasks to perform in parallel in a number of different ways. Again, methods herein can ignore the relative order of any tasks that are not collection tasks. Loopback paths though are used in the identification of the order of execution of collection tasks. A loopback path can be associated with particular nodes in the workflow, where one of the nodes is the beginning of the path and the other is the end of the path.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As noted above, decisions should be made regarding whether a system should wait for an additional sub jobs, or combine all sub-jobs already at a join task into a single sub-job and continue. In view of this, systems and methods herein provide a document workflow that allows for synchronization of an arbitrary number of sub-jobs that are processing according to a given arbitrary workflow.

To enable this synchronization, a "collect" mark is placed on any node of the workflow. The semantics of the collect mark stop the processing of the first job/sub-job that arrives into the node and check to determine if it needs to wait for other sub-jobs to arrive so that they can be joined together into a single sub-job. To determine if more sub-jobs are coming to the node, the system keeps track of all the threads of execution currently active for all sub-jobs. While any of those threads of execution are processing a sub-job, the system does not proceed to execute any collect node. Once all the sub-jobs for a given job are stopped at some collect node or have reached terminal states, the system will proceed to join all the sub-jobs that have reached and are waiting at one of the potentially many collect nodes that contain waiting sub-jobs. The particular collect node that is processed first is determined based on the topology of the workflow. The new sub-job that is created as a result of joining all the documents from all the sub-jobs waiting at the selected collect node, continues its execution in the workflow and once that sub-job (or all its children sub-jobs, if it goes through split tasks) reaches another collect node or a terminal state, the logic repeats to see which collect node should be processed next. This goes on until all sub-jobs for the job have reached terminal states.

Each link in a workflow should be labeled as a forward link or a backward link, at workflow definition time. When the user of the workflow editor starts building a workflow, the first link that is added in the workflow is labeled as forward link. From that moment on, and at any point in time during the creation of the workflow, the set of forward links in the workflow define a direct acyclic graph (DAG). This DAG defines a partial order among the nodes in the workflow in which NodeA<NodeB if NodeA precedes NodeB in the forward link workflow graph. In this partial order, for any 2 different nodes A and B, one of the following three cases has to be true: 1) A<B, 2) B<A or 3) there is no defined relationship between A and B. When the user of the workflow editor adds a link from node X to node Y, the system checks to see if there is a relationship between X and Y in the partial order. If there is no relationship or if X<Y, then the link is labeled as a forward link. If Y<X in the partial order, then the link is labeled as a backward link. The creation of a backward link has additional conditions that should be met. Some of those conditions can prevent the creation of a workflow that could never end, etc. One condition that prevents the creation of workflows with non-deterministic behavior is the following: when trying to add a backward link from node A to node B, the system identifies all pairs of collect nodes X and Y such that in the partial order X<A, Y<A and there is no relationship between X and Y. For each one of these pairs (X,Y), the system enumerates all possible paths that would go from X to Y using the backward link and all possible paths between Y and X that would use the backward link. If all those possible paths do not contain at least one common collect node Z, different than X or Y, then the backward link is prevented from being created. This validation that is called the "deterministic validation" happens at workflow design time.

At run time when all the sub-jobs in the system have either reached a terminal state or are waiting at a collect node, the system selects the collect node to process first according to the following algorithm. For any two collect nodes A and B that contain at least one waiting sub-job each, if there is a relationship between A and B in the partial order defined by the DAG, then the node that precedes the other is processed first. If there is no defined relationship between nodes A and B in the partial order, the complete workflow graph including backward links is inspected to find possible paths from A to B and possible paths from B to A. These paths are called loopback paths. If there are no loopback paths from A to B, nor from B to A, the two collect nodes A and B are processed in parallel. The same will happen if there are loopback paths from A to B and from B to A as well (all of which should go through at least one other collect node C according to the deterministic validation). If there is at least one loopback path from A to B but no loopback path from B to A, then collect node A should be processed first, and vise-versa. Following this pairwise comparison, the system identifies from all the active collect nodes which one (or which ones) are processed first.

This enables significant more flexibility in the creation and processing of document workflows. Documents can be split following any arbitrary logic, and those documents can be arranged into sub-jobs also following any arbitrary logic. This also enables flexibility by making sure all the sub-jobs are processed in a coordinated, consistent and intuitive way.

Figure 1:
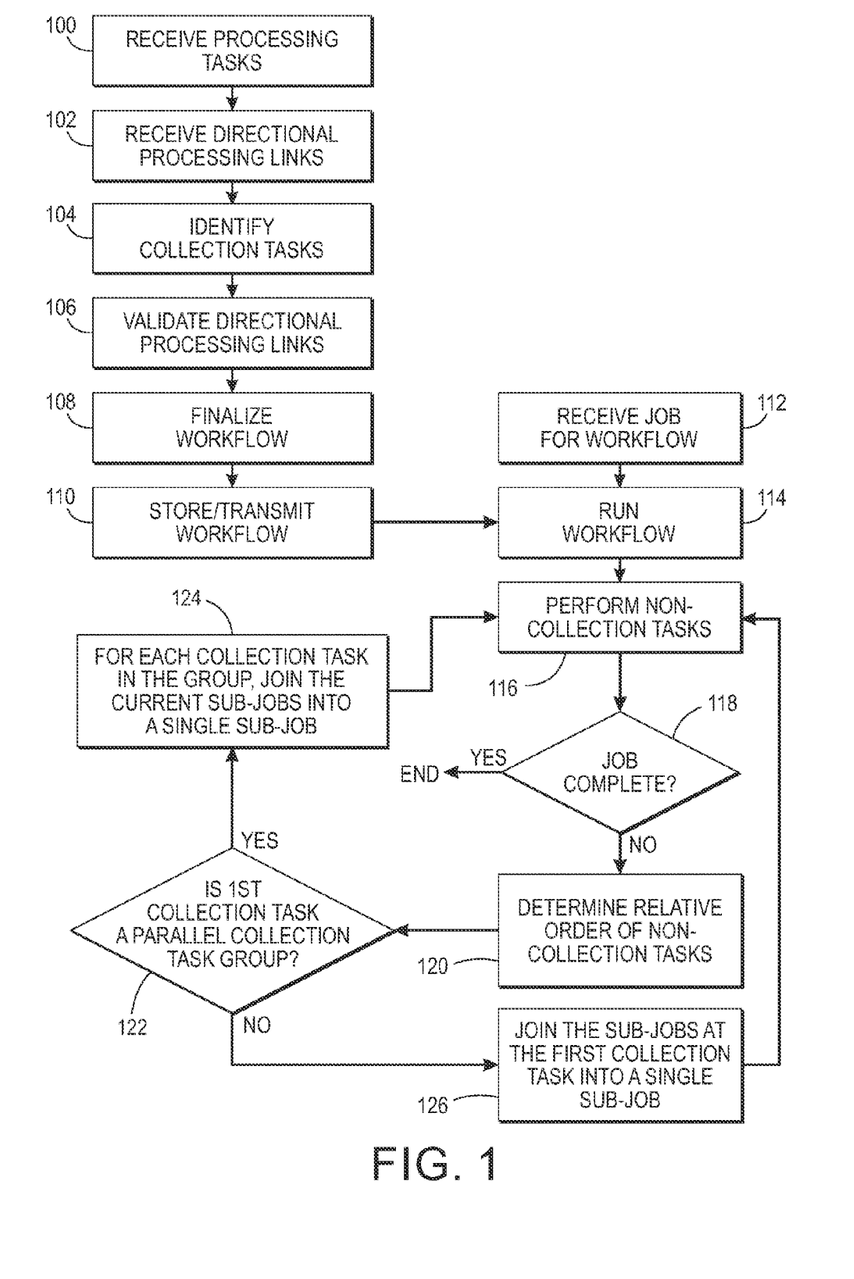
FIG. 1 is a flow diagram illustrating operations of methods and systems herein.

FIG. 1 is flowchart illustrating exemplary methods herein. In item 100, these methods herein receive (into a computerized device which can comprise one or more devices) processing tasks, which in some examples herein are document processing tasks, as part of a workflow being designed, which in some examples are a document processing workflow. In item 102, such methods also receive, into the computerized device, directional processing links (forward and backward links) specifying the relative processing order of at least two of the tasks. In item 104, the user identifies collection tasks. Thus, at workflow creation time the user decides which tasks are marked as collection tasks. Furthermore marking a task as a "collection" task is the same as making that task a "join" task. The term "join" describe what happens to the sub-jobs that arrive to that task, the "collection" mark is the mechanism that the methods and systems use for identifying which tasks are join tasks. Also, any task in the workflow could be marked as a "collection task." A collection or join task will (potentially) synchronize the execution of multiple sub-jobs and create a single sub-job from all of them. It is possible for multiple sub-jobs to arrive to the collection task from the same preceding task (and this is also true for "split" nodes). A split node does not need to have two succeeding tasks.

In item 106, these methods automatically validate the directional processing links as the directional processing links are input in item 102 based on consistency with previously input directional processing links of the workflow being designed, using the computerized device. In other words, if a directional processing link in logically inconsistent with a previously input directional processing link, the user is provided an error message in item 106; otherwise, the directional processing link is associated with the two tasks to which it corresponds.

After validating the directional processing links for the tasks received, such methods automatically finalize the workflow being designed in item 108, using the computerized device, to output a finalized workflow to another device or computer-readable storage (item 110). This finalized workflow can be used repeatedly in the future and is very repeatable, with the only changes depending on the input documents.

Thus, after creation of the finalized workflow, at many times in the future, a computerized device receives a job, as shown by item 112. In response, such methods automatically run the workflow in item 114 using the computerized device to execute the job on a device (e.g., multi-function device, printer, copier, finishing device, facsimile machine, etc.).

Next, in item 116, the methods perform the non-collection tasks. As noted above, the methods herein can ignore the relative order of any tasks that are not collection tasks. The methods herein can ignore the relative order of any tasks that are not collection tasks, and systems herein may execute tasks using different approaches that focus more on optimization of performance than the synchronization of execution of subjobs. Further, with these methods the order of execution is as simple as: once the input data for a task is ready, that task is executed. Some systems may execute jobs using a pipeline architecture in which there are multiple active tasks connected through partial input/output and the methods herein are applicable to any of those systems. In item 118, if the job is complete, processing ends; however, if the job is not complete processing proceeds to item 120.

In item 120, the methods herein determined the relative order of the non-collection tasks. In item 122, a determination is made as to whether the first collection task is a parallel collection task group. One mechanism that is used to identify tasks that are executed in parallel are sub-jobs. Given that they are independent units of work, tasks from different sub-jobs are usually executed in parallel. If so, processing proceeds to item 124 where, for each collection task in the group, the methods herein join the current sub-jobs into a single sub-job (after which processing returns to item 116). If not, processing proceeds to item 126 where the methods herein join the sub-jobs at the first collection task into a single sub-job (after which processing returns to item 116).

Figure 2:
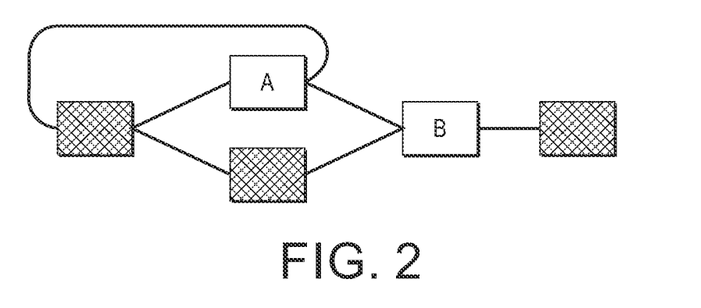
FIG. 2 is a schematic diagram illustrating operations of methods and systems herein.
Figure 3:
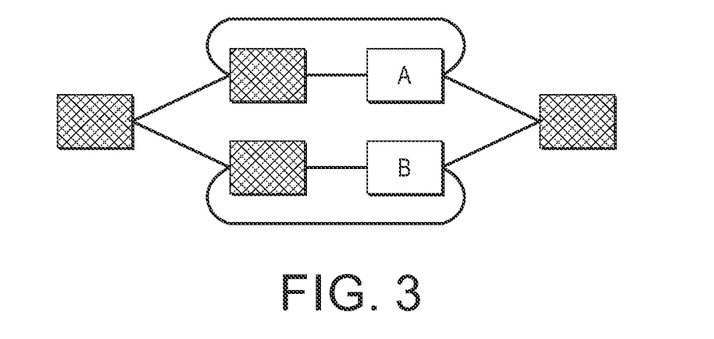
FIG. 3 is a schematic diagram illustrating operations of methods and systems herein.
Figure 4:
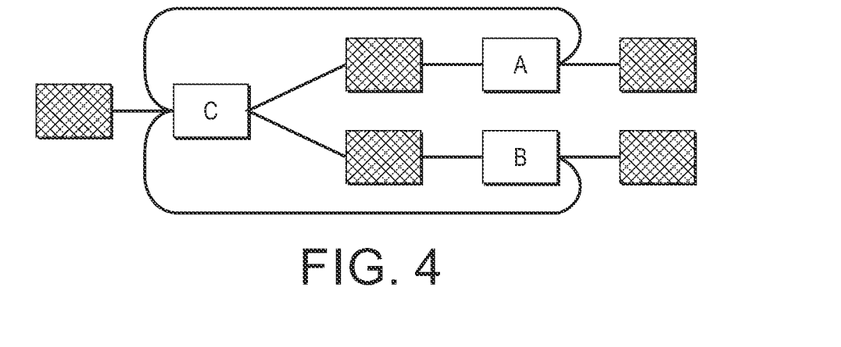
FIG. 4 is a schematic diagram illustrating operations of methods and systems herein.

Forward and backward links are shown in FIGS. 2-4. More specifically, in FIGS. 2-4 tasks are shown as boxes connected by lines. The boxes labeled A, B, and C in FIGS. 2-4 are collection or join tasks. Lines in FIGS. 2-4 going from left to right are forward links. Curved lines in FIGS. 2-4 that go from right to left (from one task to another task to its left) are backward links.

FIGS. 2-4 show the relative order of execution of collection nodes A, B, and C. For the unlabeled boxes in FIGS. 2-4 representing non-collection nodes, the order of execution is determined by the links between them. Each workflow has a single starting node. If a node has more than one forward link that connects it to more than one succeeding node, the path that each job (or sub-job) takes is determined by evaluating some logic that is associated to each one of those links.

At run time when all the sub-jobs in the system have either reached a terminal state or are waiting at a collect node, the system selects the collect node to process first according to the following algorithm. For any two collect nodes A and B that contain at least one waiting sub-job each, if there is a relationship between A and B in the partial order defined by the DAG, then the node that precedes the other will be processed first. In the example shown in FIG. 2, A will be processed before B because A comes before B in the partial order defined by the forward links.

If there is no defined relationship between nodes A and B in the partial order, the complete workflow graph including backward links is inspected to find possible paths from A to B and possible paths from B to A. These paths are called loopback paths. If there are no loopback paths from A to B nor from B to A, the two collect nodes A and B will be processed in parallel.

In the example shown in FIG. 3, there is no relationship between A and B in the partial order defined by the forward links. Furthermore, adding the backward links shows that there is not a path from B to A or from A to B. In FIG. 3, A and B could be processed in any order or they could be processed at the same time. The same will happen if there are loopback paths from A to B and from B to A as well (all of which should go through at least one other collect node C according to the deterministic validation).

In the example shown in FIG. 4, there is no relationship between A and B in the partial order defined by the forward links. Adding the backward links shows a path from B to A (B to C to A) and a path from A to B (A to C to B). In FIG. 4, case A and B could be processed in any order or they could be processed at the same time.

Figure 5:
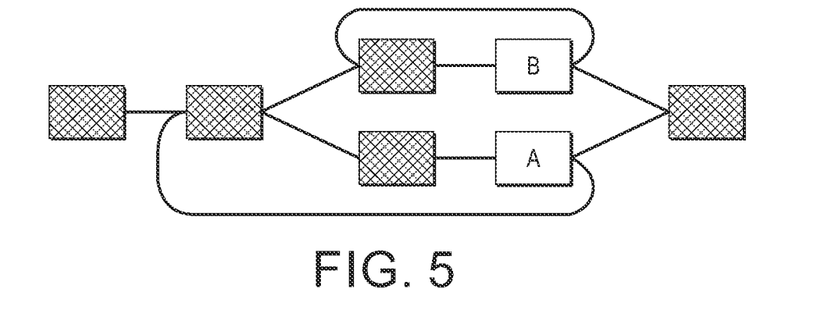
FIG. 5 is a schematic diagram illustrating operations of methods and systems herein.

If there is at least one loopback path from A to B but no loopback path from B to A, then collect node A should be processed first and vise-versa. In the example shown in FIG. 5, there is no relationship between A and B in the partial order defined by the forward links. Adding the backward links shows a path from A to B but not a path from B to A. In FIG. 5, case A is processed before B. Following this pairwise comparison, the system identifies from all the active collect nodes which one (or which ones) will be processed first.

Only the first collection node is executed (or the first collection nodes in the case of parallel processing). Once that the new sub-job is created as part of the execution of the collection node, that sub-job and any of its children sub-jobs will reach collection nodes or terminal states before any other collection node will be executed.

Figure 6:
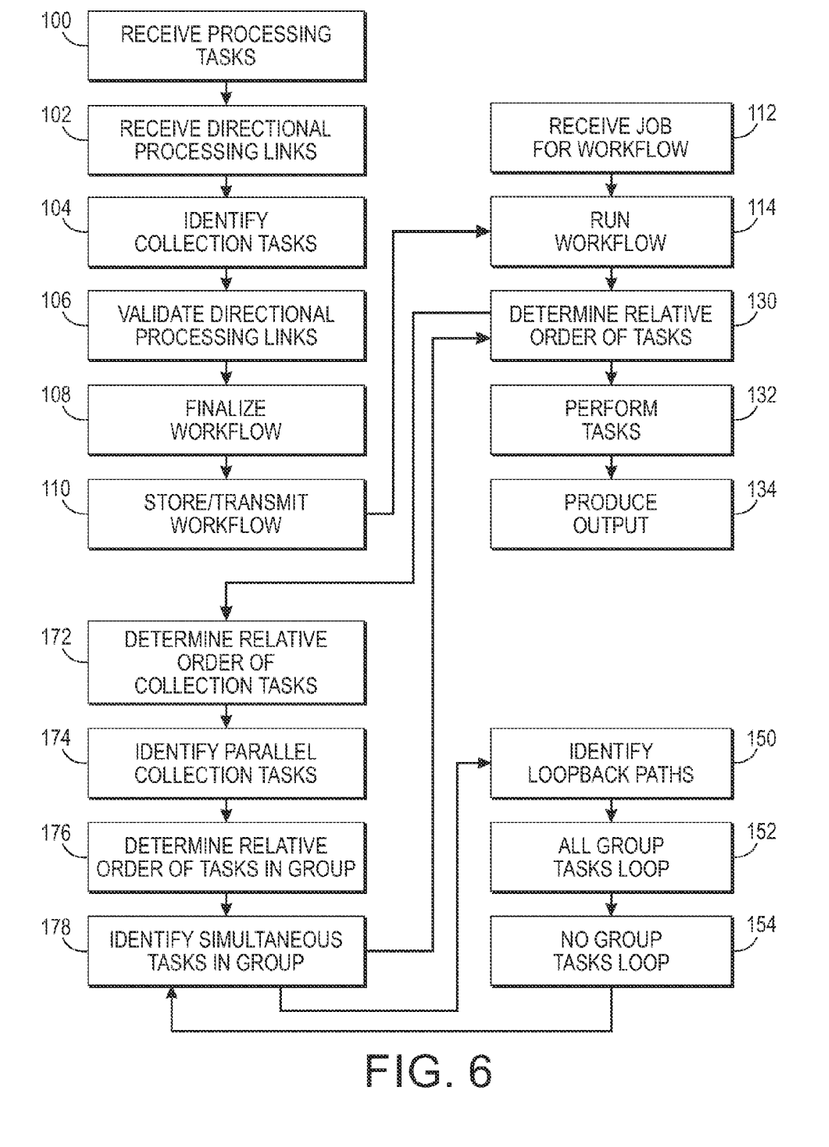
FIG. 6 is a flow diagram illustrating operations of methods and systems herein.

FIG. 6 is flowchart that is similar to FIG. 1 and illustrates exemplary methods herein. In item 100, these methods herein receive (into a computerized device which can comprise one or more devices) processing tasks, which in some examples herein are document processing tasks, as part of a workflow being designed, which in some examples are a document processing workflow. In item 102, such methods also receive, into the computerized device, directional processing links (forward and backward links) specifying the relative processing order of at least two of the tasks. In item 104, the user identifies collection tasks. Thus, at workflow creation time the user decides which tasks are marked as collection tasks. Furthermore marking a task as a "collection" task is the same as making that task a "join" task. The term "join" describe what happens to the sub-jobs that arrive to that task, the "collection" mark is the mechanism that the methods and systems use for identifying which tasks are join tasks. Also, any task in the workflow could be marked as a "collection task." A collection or join task will (potentially) synchronize the execution of multiple sub-jobs and create a single sub-job from all of them. It is possible for multiple sub-jobs to arrive to the collection task from the same preceding task (and this is also true for "split" nodes). A split node does not need to have two succeeding tasks.

In item 106, these methods automatically validate the directional processing links as the directional processing links are input in item 102 based on consistency with previously input directional processing links of the workflow being designed, using the computerized device. In other words, if a directional processing link in logically inconsistent with a previously input directional processing link, the user is provided an error message in item 106; otherwise, the directional processing link is associated with the two tasks to which it corresponds.

After validating the directional processing links for the tasks received, such methods automatically finalize the workflow being designed in item 108, using the computerized device, to output a finalized workflow to another device or computer-readable storage (item 110). This finalized workflow can be used repeatedly in the future and is very repeatable, with the only changes depending on the input documents.

Thus, after creation of the finalized workflow, at many times in the future, a computerized device receives a job, as shown by item 112. The finalized workflow is then automatically run in item 114 using the computerized device to execute the job on a device (e.g., multi-function device, printer, copier, finishing device, facsimile machine, etc.). As part of running the workflow, the methods herein automatically determine the relative order in which the tasks are performed as shown by item 130. Following this, the tasks are performed in item 132, and any output resulting from the workflow is produced in item 134.

As part of determining the relative order in which the tasks are performed in item 130, processing steps 140-146 are performed. Again, the methods herein can ignore the relative order of any tasks that are not collection tasks. The methods herein can ignore the relative order of any tasks that are not collection tasks, and systems herein may execute tasks using different approaches that focus more on optimization of performance than the synchronization of execution of sub-jobs. Further, with these methods the order of execution is as simple as: once the input data for a task is ready, that task is executed. Some systems may execute jobs using a pipeline architecture in which there are multiple active tasks connected through partial input/output and the methods herein are applicable to any of those systems. Thus, the task order determination processing in item 130 automatically determines the relative processing order of the collection tasks based on the directional processing links (again, using the computerized device) as shown by item 140.

Within the relative processing order of the collection tasks, these methods also automatically identify which of the collection tasks to perform in parallel in item 142 based on which of the collection tasks do not use output from other collection tasks (again, using the computerized device). Again, one mechanism that is used to identify tasks that are executed in parallel are sub-jobs. Given that they are independent units of work, tasks from different sub-jobs are usually executed in parallel Further, in item 144, these methods automatically determine the relative processing order of each group of tasks. Tasks are in the same group if such tasks provide output to the same collection task, which is determined based on the directional processing links (using the computerized device). Also, within the relative processing order of each group of tasks, such methods automatically identify which tasks to perform in parallel in item 146 based on which tasks do not use output from other the tasks within the same group of the tasks (using the computerized device).

While identifying which tasks to perform simultaneously in item 146, these methods additionally identify loopback paths among the tasks, based on the directional processing links (using the computerized device) as shown by item 150. Any path between two nodes of the workflow that contains at least one path that is marked as a backwards path is a loopback path. The marking of paths as backwards paths happens at workflow creation time. For example, in a workflow that has a path that goes from A to B and another path that goes from B to A, one of those paths is a forward path and the other one is a backward path. The person creating the workflow makes that determination at workflow creation time. In the methods herein, the path that is created first is the forward path the path that is created last is marked as the backward path.

Such methods identify which tasks to perform simultaneously in a number of different ways. For example, as shown in item 152, if there is a lack of loopback paths among the tasks within a group, all such tasks within that group are performed simultaneously. Also, when all tasks within a group utilize loopback paths, all such tasks within that group are performed simultaneously as shown in item 154.

Figure 7:
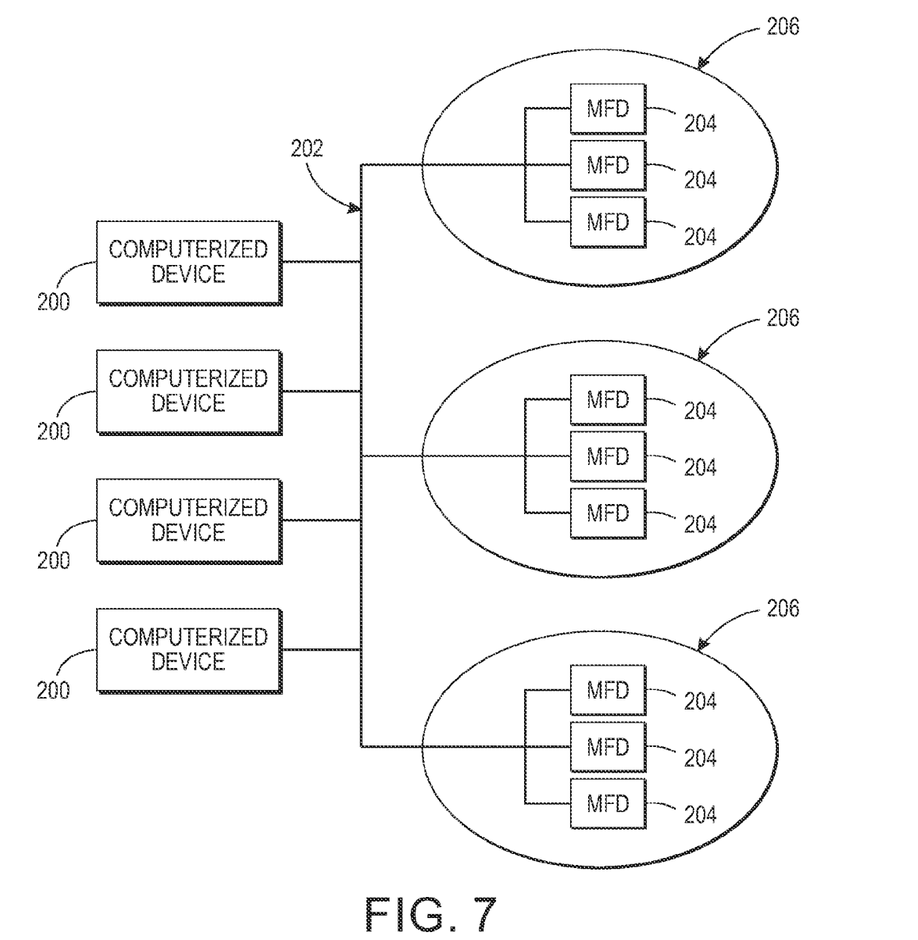
FIG. 7 is a schematic diagram illustrating systems herein.

As shown in FIG. 7, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 8:
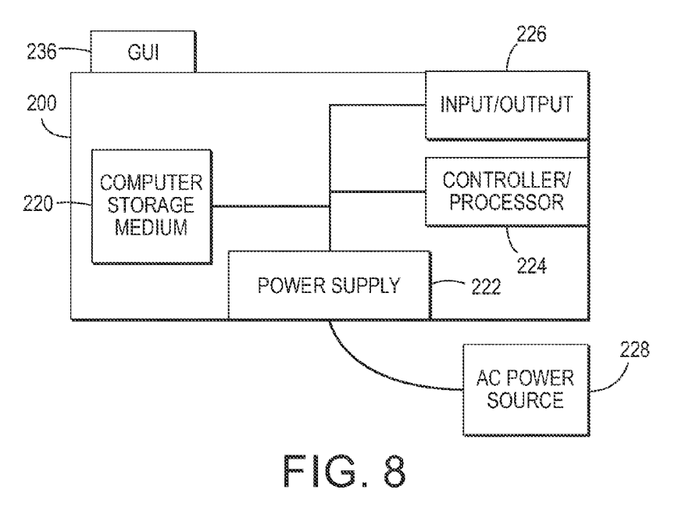
FIG. 8 is a schematic diagram illustrating devices herein.

FIG. 8 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 8, a body housing has one or more functional components that operate on power supplied from an alternating current (AC) source 228 by the power supply 222. The power supply 222 can comprise a power storage element (e.g., a battery, etc).

Figure 9:
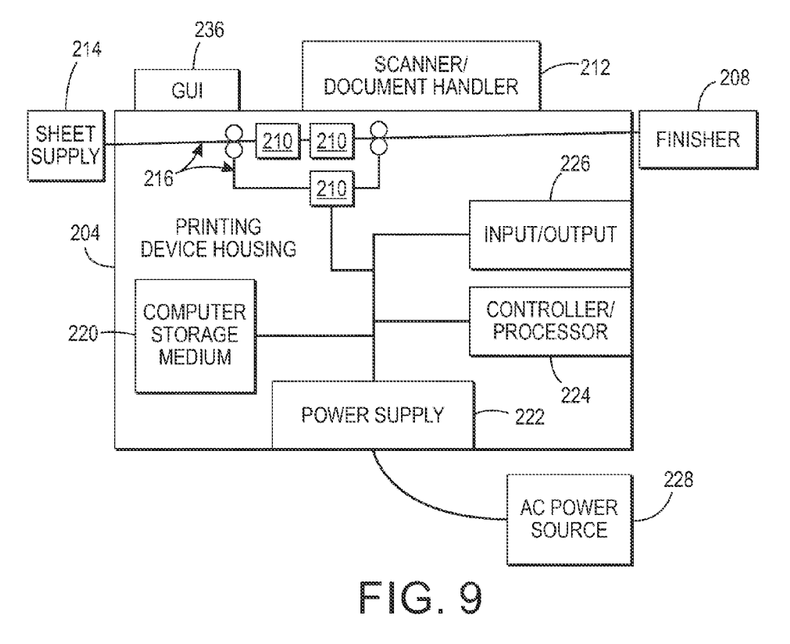
FIG. 9 is a schematic diagram illustrating devices herein.

FIG. 9 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

Therefore, an exemplary system herein includes a computerized device 200 that receives document processing tasks as part of a document processing workflow being designed, and that receives directional processing links specifying a relative processing order of at least two of the document processing tasks. This system also includes a document processing device 204 that is operatively connected to the computerized device 200.

The computerized device 200 automatically validates the directional processing links as the directional processing links are input based on consistency with previously input directional processing links of the document processing workflow being designed. After the validating the directional processing links for the document processing tasks received, the computerized device 200 automatically finalizes the document processing workflow being designed to output a finalized workflow from an input/output port 226 of the computerized device 200.

Also, the computerized device 200 automatically determines the relative processing order of the collection tasks based on the directional processing links. Within the relative processing order of the collection tasks, the computerized device 200 automatically identifies ones of the collection tasks to perform in parallel based on which collection tasks do not use output from other collection tasks. Similarly, the computerized device 200 automatically determines a relative processing order of each group of the document processing tasks that provide output to a same one of the collection tasks based on the directional processing links. Again, within the relative processing order of each group of the document processing tasks, the computerized device 200 automatically identifies the document processing tasks to perform in parallel based on which document processing tasks do not use output from other document processing tasks within the same group of the document processing tasks.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It is appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
receiving, into a computerized device, a finalized workflow; and
automatically determining a relative order in which processing tasks are performed by:
automatically determining a relative processing order of collection tasks based on directional processing links, using said computerized device;
within said relative processing order of said collection tasks, automatically identifying ones of said collection tasks to perform in parallel based on said collection tasks not using output from other ones of said collection tasks, using said computerized device;
automatically determining a relative processing order of each group of said processing tasks that provide output to a same one of said collection tasks based on said directional processing links, using said computerized device; and
within said relative processing order of each group of said processing tasks, automatically identifying said processing tasks to perform in parallel based on said processing tasks not using output from other ones of said processing tasks within a same group of said processing tasks, using said computerized device.

2. The method according to claim 1, further comprising identifying loopback paths as paths between two nodes of said finalized workflow that contain at least one path that was marked as a backwards path at workflow creation time.

3. The method according to claim 2, further comprising running said finalized workflow by identifying said processing tasks to perform in parallel based on a lack of said loopback paths among said processing tasks within each group of said processing tasks.

4. The method according to claim 2, further comprising running said finalized workflow by identifying said processing tasks to perform in parallel based on all said processing tasks within each group of said processing tasks creating said loopback paths.

5. The method according to claim 1, further comprising running said finalized workflow by:
receiving a job by said computerized device; and
automatically identifying processing tasks of said finalized workflow utilized by said job, using said computerized device.

6. A method comprising:
receiving, into a computerized device, processing tasks as part of a workflow being designed;
receiving, into said computerized device, directional processing links specifying a relative processing order of at least two of said processing tasks;
automatically validating said directional processing links as said directional processing links are input based on consistency with previously input ones of said directional processing links of said workflow being designed, using said computerized device;
after said validating said directional processing links for said processing tasks received, automatically finalizing said workflow being designed, using said computerized device, to output a finalized workflow; and
automatically determining a relative order in which said processing tasks are performed by:
automatically determining a relative processing order of collection tasks based on said directional processing links, using said computerized device;
within said relative processing order of said collection tasks, automatically identifying ones of said collection tasks to perform in parallel based on said collection tasks not using output from other ones of said collection tasks, using said computerized device;
automatically determining a relative processing order of each group of said processing tasks that provide output to a same one of said collection tasks based on said directional processing links, using said computerized device; and
within said relative processing order of each group of said processing tasks, automatically identifying said processing tasks to perform in parallel based on said processing tasks not using output from other ones of said processing tasks within a same group of said processing tasks, using said computerized device.

7. The method according to claim 6, further comprising identifying loopback paths as paths between two nodes of said finalized workflow that contain at least one path that was marked as a backwards path at workflow creation time.

8. The method according to claim 7, further comprising running said finalized workflow by identifying said processing tasks to perform in parallel based on a lack of said loopback paths among said processing tasks within each group of said processing tasks.

9. The method according to claim 7, further comprising running said finalized workflow by identifying said processing tasks to perform in parallel based on all said processing tasks within each group of said processing tasks utilizing said loopback paths.

10. The method according to claim 6, further comprising running said finalized workflow by:
receiving a job by said computerized device; and
automatically identifying processing tasks of said finalized workflow utilized by said job, using said computerized device.

11. A method comprising:
receiving, into a computerized device, document processing tasks as part of a document processing workflow being designed;
receiving, into said computerized device, directional processing links specifying a relative processing order of at least two of said document processing tasks;
automatically validating said directional processing links as said directional processing links are input based on consistency with previously input ones of said directional processing links of said document processing workflow being designed, using said computerized device;
after said validating said directional processing links for said document processing tasks received, automatically finalizing said document processing workflow being designed, using said computerized device, to output a finalized workflow; and
automatically determining a relative order in which said document processing tasks are performed by:
automatically determining a relative processing order of collection tasks based on said directional processing links, using said computerized device;
within said relative processing order of said collection tasks, automatically identifying ones of said collection tasks to perform in parallel based on said collection tasks not using output from other ones of said collection tasks, using said computerized device;

automatically determining a relative processing order of each group of said document processing tasks that provide output to a same one of said collection tasks based on said directional processing links, using said computerized device; and within said relative processing order of each group of said document processing tasks, automatically identifying said document processing tasks to perform in parallel based on said document processing tasks not using output from other ones of said document processing tasks within a same group of said document processing tasks, using said computerized device.

12. The method according to claim 11, further comprising identifying loopback paths as paths between two nodes of said finalized workflow that contain at least one path that was marked as a backwards path at workflow creation time.

13. The method according to claim 12, further comprising running said finalized workflow by identifying said document processing tasks to perform in parallel based on a lack of said loopback paths among said document processing tasks within each group of said document processing tasks.

14. The method according to claim 12, further comprising running said finalized workflow by identifying said document processing tasks to perform in parallel based on all said document processing tasks within each group of said document processing tasks utilizing said loopback paths.

15. The method according to claim 11, further comprising running said finalized workflow by:

receiving a document processing job by said computerized device; and automatically identifying document processing tasks of said finalized workflow utilized by said document processing job, using said computerized device.

16. A system comprising:

a computerized device receiving a finalized workflow; and a document processing device comprising a processor and a non-transitory memory operatively connected to said computerized device, said computerized device automatically determining a relative order in which processing tasks are performed by:

automatically determining a relative processing order of collection tasks based on directional processing links;

within said relative processing order of said collection tasks, automatically identifying ones of said collection tasks to perform in parallel based on said collection tasks not using output from other ones of said collection tasks;

automatically determining a relative processing order of each group of said processing tasks that provide output to a same one of said collection tasks based on said directional processing links; and within said relative processing order of each group of said processing tasks, automatically identifying said processing tasks to perform in parallel based on said processing tasks not using output from other ones of said processing tasks within a same group of said processing tasks.

17. The system according to claim 16, said computerized device identifying loopback paths as paths between two nodes of said finalized workflow that contain at least one path that was marked as a backwards path at workflow creation time.

18. The system according to claim 17, said computerized device running said finalized workflow by identifying said processing tasks to perform in parallel based on a lack of said loopback paths among said processing tasks within each group of said processing tasks.

19. The system according to claim 17, said computerized device running said finalized workflow by identifying said processing tasks to perform in parallel based on all said processing tasks within each group of said processing tasks utilizing said loopback paths.

20. The system according to claim 16, said computerized device running said finalized workflow by:

receiving a document processing job by said computerized device; and automatically identifying document processing tasks of said finalized workflow utilized by said document processing job, using said computerized device.

* * * * *